UNITED STATES PATENT OFFICE.

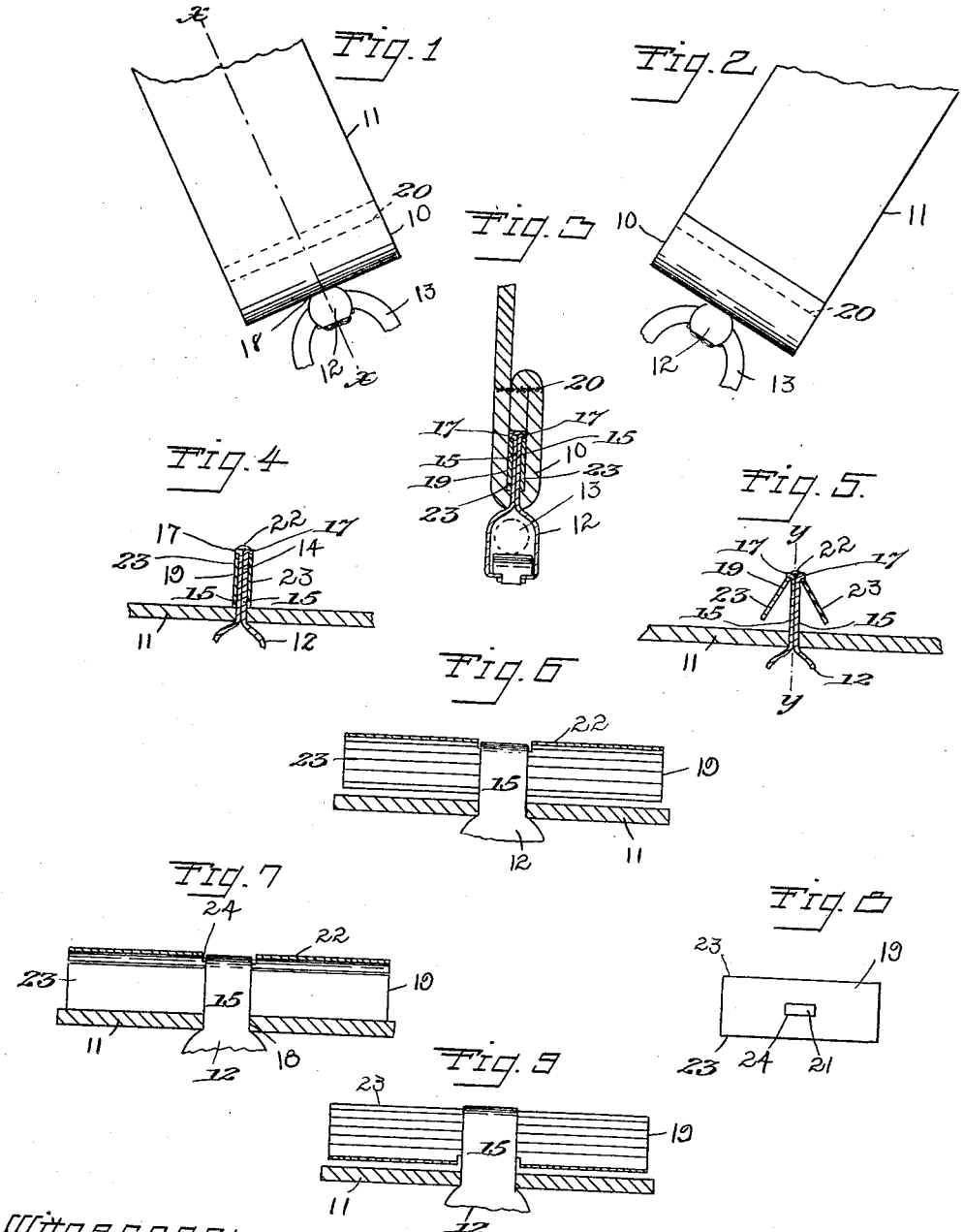

GEORGE E. PRENTICE, OF NEW BRITAIN, CONNECTICUT.

CORD-EYE SUPPORT.

1,111,760.  Specification of Letters Patent.  Patented Sept. 29, 1914.

Application filed October 2, 1913. Serial No. 792,948.

*To all whom it may concern:*

Be it known that I, GEORGE E. PRENTICE, a citizen of the United States, residing at New Britain, in the county of Hartford and State of Connecticut, have invented certain new and useful Improvements in Cord-Eye Supports, of which the following is a specification.

My invention relates to improvements in cord eye supports and the object of my improvement is simplicity and economy in construction and convenience and efficiency in use.

In the accompanying drawing, Figure 1 is a front elevation of my improved cord eye support and part of a cord of a cord back for suspenders. Fig. 2 is a rear elevation of the same. Fig. 3 is a sectional view on an enlarged scale on the line $x$ $x$ of Fig. 1. Fig. 4 is a similar view of the same, part of the cord eye being broken away, previous to stitching the webbing. Fig. 5 is a similar view of the same just before closing the supporting or connecting bar. Fig. 6 is a sectional view on the line $y$ $y$ of Fig. 5. Fig. 7 is a similar view of the parts in the position shown in Fig. 4. Fig. 8 is a plan view of the blank for the connecting bar, on the same scale as Fig. 1. Fig. 9 is a view corresponding to Fig. 6 and on the same scale of a modification of my cord eye support.

My cord eye support comprises a loop 10 in the webbing 11 and means for connecting the same with the cord eye 12. The cord eye 12 may be similar to the one shown and described in my patent application, Serial No. 769,056, or some other form suitable for receiving and operatively supporting the cord 13 of a cord-back for suspenders, and which is provided with an upwardly extending shank 14. The said shank 14 is made of sheet metal of appreciable width and may be either single or double. I prefer to have the double form as shown and comprising two similar upwardly extending members 15 connected to the upper end of the body portion of the cord eye 12. The said members 15 are of appreciable length and have the opposed faces in abutment for the full upward extent, and at the upper ends are provided with outwardly directed lips 17, which overhang the body portions of the members 15. The webbing 11 is provided with a slit 18 at the apex of the loop 10 which is suitable to receive the shank 14. The shank 14 is admitted through the slit 18 and is positioned between the arms of the loop 10. The connecting bar 19 is then applied to the shank 14, after which the arms of the loop 10 are secured by stitching 20 above the said bar 19. The connecting bar 19 comprises a piece of sheet metal, rectangular in formation preferably of slightly less width than the width of the webbing 11, and having a longitudinal slot 21 that is a fit for the shank lengthwise between the end walls and which in width is suitable to admit the lips 17 when opened out in the form of the blank as shown in Fig. 8 or when bent to U or V shape as shown in Fig. 5. The said bar 19 is bent to the form mentioned, as shown in Fig. 5, and in this form is ready for assembly with the shank 14. The bar 19 is divided by the slot 21 and the apex portions 22 in line therewith into two lateral wings 23. The wings 23 are of the same width as the length of body portion of the shank 14. The lips 17 are admitted through the slot 21, preferably with the apex portions 22 uppermost, although the same may be applied in the reverse position as in the modification shown in Fig. 9. Then the wings 23 are closed together, the portions opposed to the shank 14 being brought into abutment therewith and the portions on each side thereof being brought into abutment one with the other. In the position described the lips 17 are engaged with the lateral walls 24 of the slot 21 and which walls serve as supporting shoulders therefor. After the bar 19 has been connected to the shank 14 in the manner described the arms of the loop 10 are connected by the stitching 20.

The preferred form of construction is that shown in Fig. 3. The modification shown in Fig. 9 is presented to show that the form shown in Fig. 1 mentioned may be departed from and still obtain substantially the same result and it is evident that the result mentioned may be obtained by means of other changes in details, and I do not limit myself in applying my invention to the precise forms shown and described. For instance, the lips 17 constitute essentially a head at the end of the shank 14 and other forms of head may be provided in some cases if desired.

I claim as my invention:—

1. A cord eye and a connection bar, the said cord eye having an upwardly extending shank provided with a head at the upper end, the said connection-bar consisting of a piece of sheet material bent upon itself to provide a double thickness of the said sheet material, the said shank being positioned at the middle portion of the said bar, extending at right angles thereto, the opposed faces of the said shank and bar being in abutment, and the said head being in bearing engagement with the opposed edge portions of the said bar.

2. In combination, a cord eye having a shank, a head at the free end of the said shank, and a connection bar, the said connection bar comprising a strip of sheet metal having a slot and a pair of wings, one on each side of the said slot, the said wings being closed against the shank with the said head engaged with the opposed edges of the said wings.

3. A cord eye and supporting bar therefor the said cord eye having a shank of sheet metal, and having the upper end bent over to form a head, the said supporting bar being formed of sheet metal and having two wings connected by apex portions and a slot separating the said two wings at the middle, between the said apex portions, the said shank extending across the supporting bar and being positioned in the said slot, and the said wings being closed against the said shank.

GEORGE E. PRENTICE.

Witnesses:
R. B. CODLING,
LOUIS M. SCHMIDT.

Copies of this patent may be obtained for five cents each, by addressing the "Commissioner of Patents, Washington, D. C."